United States Patent [19]
Sartori et al.

[11] Patent Number: 5,584,217
[45] Date of Patent: Dec. 17, 1996

[54] PRECISON ADJUSTABLE TABLE FOR RADIAL ARM SAW

[76] Inventors: James A. Sartori, 228 Countryside La., Williamsville, N.Y. 14221; Michael J. Sartori, 1721 Billington Rd., East Aurora, N.Y. 14052

[21] Appl. No.: 334,933

[22] Filed: Nov. 7, 1994

[51] Int. Cl.$^6$ ........................................................ B26D 7/01
[52] U.S. Cl. ........................... 83/468; 83/468.2; 83/477; 83/522.19
[58] Field of Search .................................... 83/477, 468.7, 83/468, 522.19, 522.21, 468.2; 269/304

[56] References Cited

U.S. PATENT DOCUMENTS 1,992,600  2/1935  Blomstrom ............................. 83/468.2
5,230,269  7/1993  Shiotani et al. ........................ 83/477.2

*Primary Examiner*—Kenneth E. Peterson
*Attorney, Agent, or Firm*—Phillips, Lytle, Hitchcock, Blaine & Huber

[57] ABSTRACT

A precision adjustable saw table adapted for use with a radial arm saw includes a cutting table slidably mounted to the base table of the radial arm saw. Adjusters are mounted to the base table and are adapted to precisely and accurately position the cutting table in relation to the base table, and thus, the saw blade of the radial arm saw. A measurer is adapted to precisely and accurately measure the position of the cutting table in relation to the base table, and thus, the saw blade are mounted to the base table.

12 Claims, 3 Drawing Sheets

PRECISON ADJUSTABLE TABLE FOR RADIAL ARM SAW

TECHNICAL FIELD

This invention relates generally to an adjustable cutting table for a radial arm saw, and, more particularly, to a micro-adjustable cutting table adapted to provide accurate and precise adjustments to the kerf of a rip-cut made by a radial arm saw.

BACKGROUND OF THE INVENTION

All radial arm saws currently available utilize a chipboard platen securely mounted to the support frame of a saw. Movable spacers and clamps are usually employed to mount a guide fence at different positions on the platen. The space between the guide fence and saw blade correspondences to the cut width made to a work piece. However, the clamp-and-cut adjustment method provides only gross adjustments and not fine adjustments.

A second deficiency with current radial arm saws is difficulty in making a small change to the kerf of a rip-cut. Prior art teaches slight adjustments can be made to the position of the saw blade such that the saw blade is no longer parallel to the guide fence. Accordingly, when a work piece is slid along the guide fence into the nonparallel saw blade, the kerf made will be larger than if the saw blade was parallel. However, precise and accurate increases to the kerf are not possible with the prior art. The saw blade is mounted to a saw carriage which is locked to rails which overhang the platen. The saw carriage is mounted to overhanging rails by a threaded stud and knob. When a small change in the kerf is required, the knob is loosened, the carriage rolled a small amount, and the knob retightened. However, the retightening of the knob itself, will sometimes move the carriage and change the cut aspect of the saw blade, thus changing the kerf. In addition, the scale on the overhanging rails is generally unreliable for changes less than 1/32 of an inch.

In addition, it is difficult to ensure the guide fence is parallel to the saw blade using the clamp-and-cut method. Ensuring the guide fence and saw blade are parallel is important for two reasons: it reduces the chance of kick-back, and reduces the chance of chipping and scarring the finish the work piece along the cut.

Each of these radial arm saw deficiencies was summarized in an article entitled "Coping with your Radial Arm Saw" published in the July/August 1989 issue of *The Woodworkers Journal,* which stated "most woodworkers thoroughly distrust radial arm saws. The saws are so notoriously sloppy that shops often only use them for rough work". Accordingly, it would be advantageous to provide a device which adapts radial arm saws to perform precise and accurate cuts and that can accurately and precisely adjust the kerf of the saw.

BRIEF SUMMARY OF THE INVENTION

With parenthetical reference to the various drawing of figures, the present invention is a micro-adjustable saw table (20) adapted for use with a radial arm saw. A radial arm saw makes rip-cuts and cross-cuts to a desired work piece (38), and includes a circular saw blade (27) and a base table. The micro-adjustable saw table comprises a cutting table (21) mounted to the base table, adjustment means (28) mounted to the base table for precisely and accurately positioning the cutting table in relation to the base table and saw blade, measuring means (40) mounted to the base table to precisely and accurately measure the position of the cutting table in relation to the base table and the saw blade. The invention allows the precise and accurate rip-cutting of a work piece by a radial arm saw.

Accordingly, the general object of the invention is to provide a precision adjustable table adapted to work with currently existing radial arm saws that will provide precise and accurate adjustments of cut widths made by the radial arm saw.

Another object is to provide a factory produced precision adjustable table for a radial arm saw that will allow a radial arm saw to provide precise and accurate cut widths.

Another object of the invention is to provide a precision adjustable saw table for a radial arm saws that is adjusted using a system of adjusting screws.

DETAILED DESCRIPTION OF THE INVENTION

Figure 1:
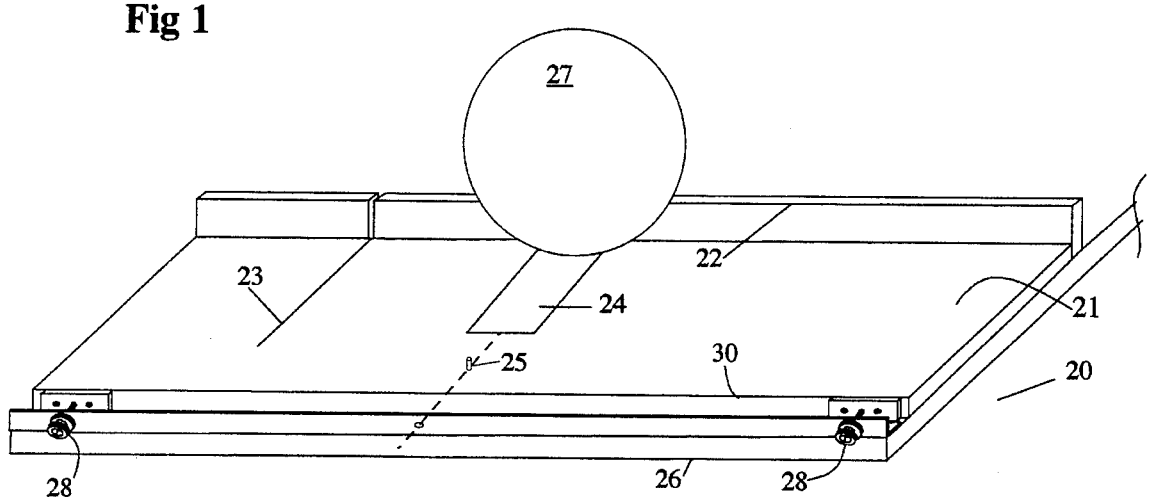
FIG. 1 is a perspective view of a first embodiment of the invention.

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Adverting to FIGS. 1–4, a first embodiment of the adjustable saw table 20 is shown. Adjustable saw table 20 is designed as a retrofit for existing table saws and comprises a slidable cutting table 21 having a guide fence 22, a groove for cross-cutting 23, a recess for rip-cutting 24 and a dowel 25 extending vertically and perpendicular to the top surface of cutting table 21. Cutting table 21 rests on the original cutting surface of the retrofitted saw.

Adjustable saw table 20 also comprises fixed angle 26, an L-shaped metal bracket, which is fixedly mounted to the original cutting surface. Adjustment means, severally indicated at 28, connect fixed angle 26 to the original cutting surface. Saw blade 27 is shown in its rip-cutting orientation.

Figure 2:
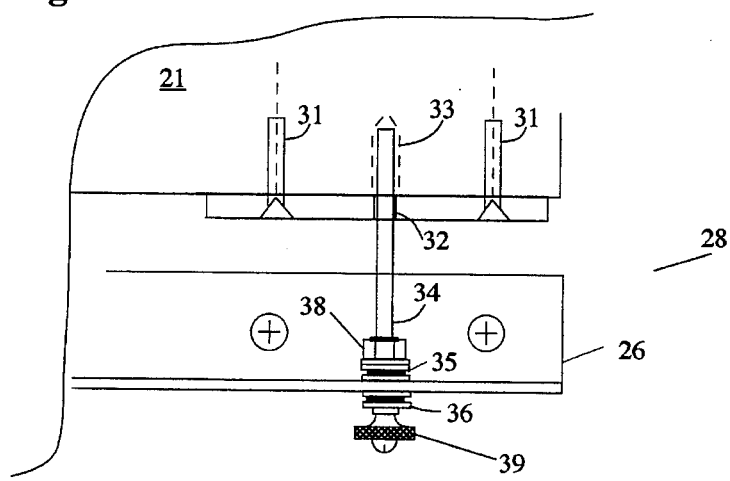
FIG. 2 is a top plan view, partially in section, of a portion of FIG. 1.

As best shown in FIG. 2, adjustment means 28 comprises an attachment plate 29 mounted to surface 30 of cutting table 21 by screws, severally indicated at 31. Attachment plate 29 includes a threaded aperture 32 which registers with a blind bore 33 in surface 30. An adjusting screw 34 proceeds through a spring washer 35, an aperture in fixed angle 26, a second spring washer 36, elastic stop nut 38, aperture 32 and into blind bore 33.

Knurled thumb screw 39 is securely tightened just below the head of adjusting screw 34. Thumb screw 39 makes it easier for rotating adjusting screw 34 by hand. However, it is typical to use a screwdriver on the head of adjusting screw 34 to advance the screw. The position of the round head provides a visual check on the advancement made by rotation. A wing nut can also be used in place of thumb screw 39, and will also provide a visual check on rotational position. First spring washer 35 is held on the shaft of adjusting screw 34 between thumb screw 39 and fixed angle 26. In addition, second spring washer 36 is held in place between fixed angle 26 and elastic stop nut 38, which is a prevailing torque nut. Compressed spring washers 35 and 36 provide the friction needed to prevent adjusting screw 34 from rotating during vibration caused by cutting.

The threads of screw 34 are adapted to mate with the threads of aperture 32. Here, adjusting screw 34 is a 10-32 machine screw which is known to advance 1/32 of an inch by revolution. It is important screws with a known threaded pitch are utilized to ensure the precise and accurate movement of the cutting table. Other common screws could be used such as an 1/4-20 NC screw which advances 50/1000 of an inch per revolution.

Figure 3:
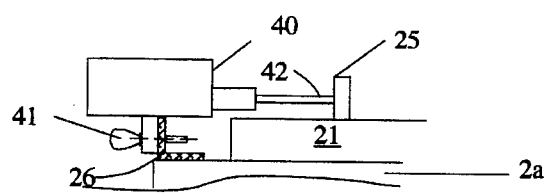
FIG. 3 is an end elevation, partially in section of a portion of FIG. 1, showing a dial indicator mounted to the invention.
Figure 4:
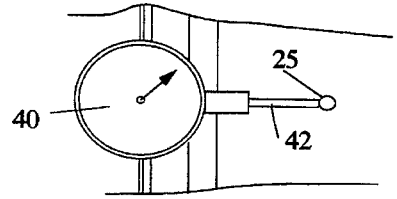
FIG. 4 is a top plan view of FIG. 3.

The invention also contemplates the use of a dial indicator 40 to measure the precise movement of the cutting table relative to the existing cutting surface. FIGS. 3 and 4 show dial indicator 40 fixedly mounted to fixed angle 26 by a screw 41. Rod 42 is biased to extend away from a dial indictor 40. The free end of rod 42 rests against dowel 25. As cutting table 21 moves away from or toward dial indicator 40, rod 42 will either retract or extend and cause dial indicator 40 to indicate the distance traveled by dowel 25.

The use of adjustable table saw 20 is straight forward. Cutting table 21 is positioned such that the distance between guide fence 22 and saw blade 27 is approximately the desired cut width. The necessary correction is measured by any well-known precision measuring system (i.e., dial calipers). The dial indicator is set to zero and screws 34 of adjustment means 28 are equally adjusted to advance or retract cutting table 21 until dial indicator 40 measures the desired correction.

As adjusting screws 34 are rotated clockwise through threaded aperture 32, cutting table 21 will be advanced away from fixed angle 26 with a one to one relation with the advancement of the screw. For example, assuming adjusting screws 34 are 10-32 NF screws which advance 1/32 of an inch per revolution, a half revolution of adjusting screws 34 will increase the rip-cut width 1/64 of an inch. Conversely, making the same assumptions, adjusting screws 34 are rotated counterclockwise one half revolution, the rip-cut width will decrease 1/64 of an inch as cutting table 21 travels toward fixed angle 26.

It is imperative both adjustment means are rotated to provide equal movement of cutting table 21. Otherwise, guide fence 22 will become non-parallel to saw blade 27.

FIGS. 5–9 show a second embodiment of the invention which is adapted to also retrofit radial arm saws. The existing radial arm saw includes support rails, severally indicated at 43, upon which a base table 44 rests. Base table 44 may be a 3/8 inch thick particle board or masonite slab. A moveable cutting table 45 comprises four sections; a main portion 46, rip-cut guide fence 48, filler portion 49 and cross-cut guide fence 50. The different portions of cutting table 45 are held tightly together by pressure exerted between adjustable clamps 51 and adjustment means 52 (described in greater detail hereafter).

Figure 5:
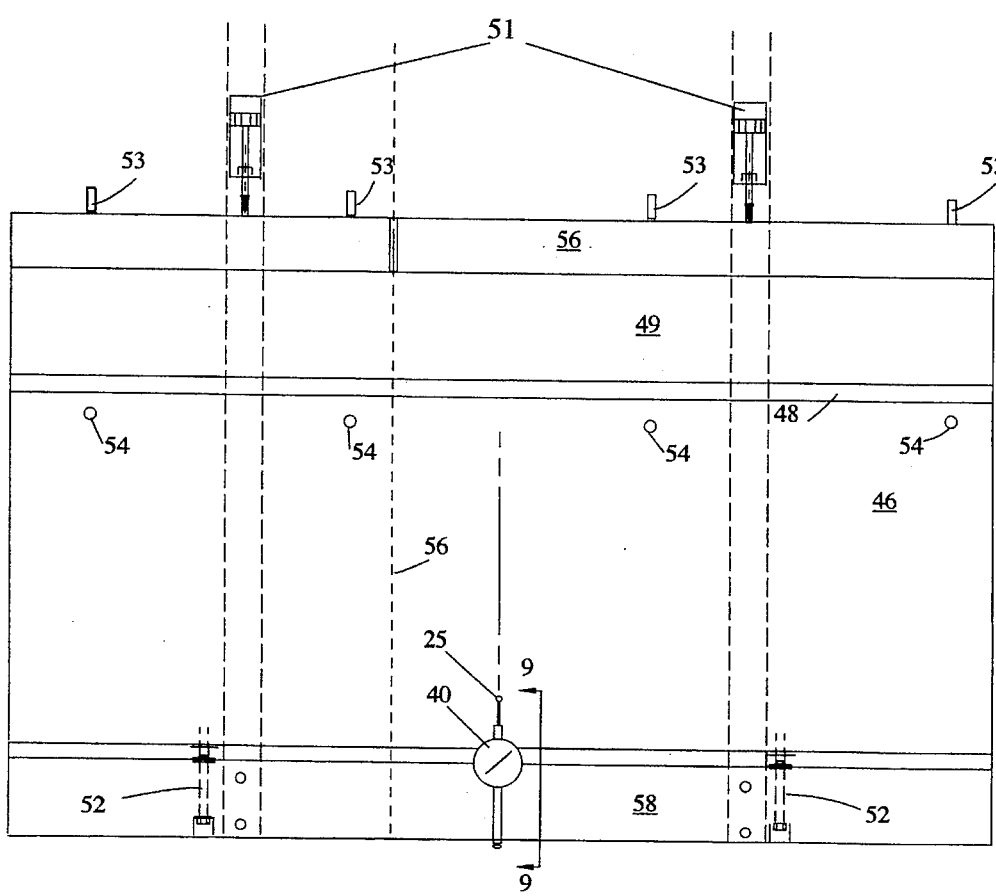
FIG. 5 is a top plan view of a second embodiment of the invention.
Figure 6:
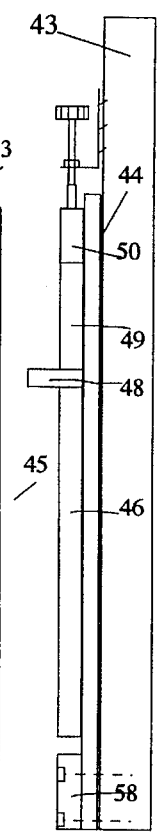
FIG. 6 is an right end elevation of FIG. 5.

FIGS. 5 and 6 show cutting table 45 configured to perform a rip-cut. Cutting table 45 can be configured to cross-cut if rip-cut guide fence 48 and cross-cut guide fence 50 switch positions. Cross-cut guide fence 50 is positioned vertically by placing its dowels, severally indicated at 53, into openings 54. This will position opening 55 generally perpendicular to cutting table 45 along line 56, thus allowing a saw blade to cross-cut a work piece pressed against cross-cut guide fence 50.

Figure 7:
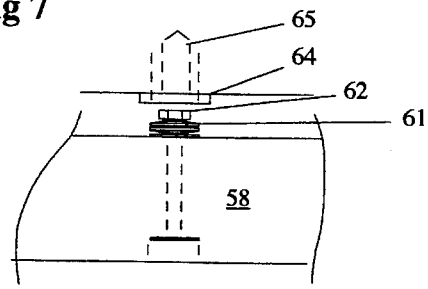
FIG. 7 is a top plan view, partially in cut-away, of a portion of FIG. 5.
Figure 8:
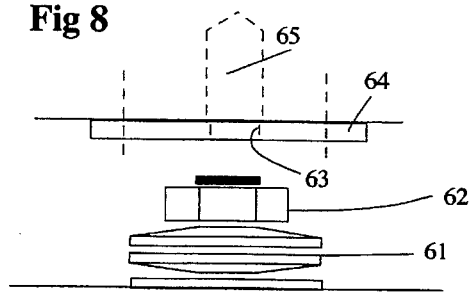
FIG. 8 is an enlargement of a portion of FIG. 7.
Figure 8:
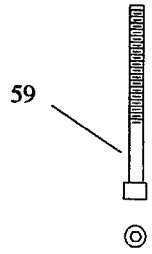
Figure 9:
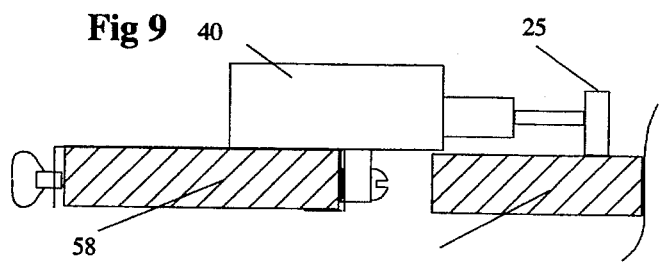
FIG. 9 is a sectional view taken along line 9—9 in FIG. 5.
Figure 10:
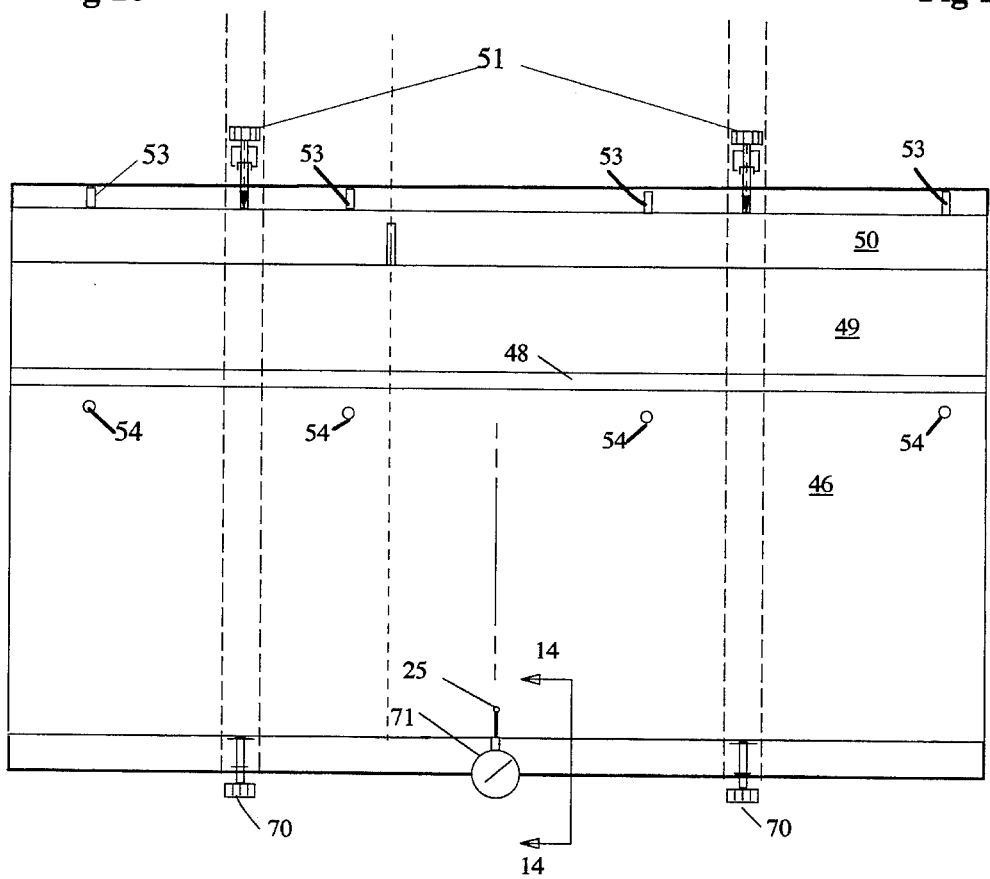
FIG. 10 is a top plan view of a third embodiment of the invention.
Figure 11:
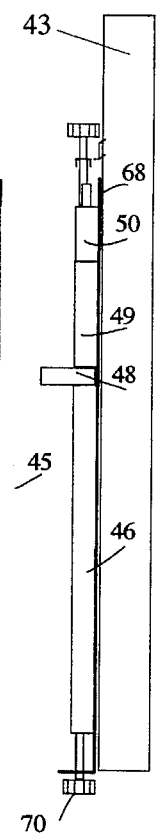
FIG. 11 is a right end elevation of FIG. 10.

Fixed portion 58 is fixedly mounted to both base table 44 and base rails 43 by screws. Adjustment means, severally indicated at 52, are mounted to fixed portion 58. As best shown in FIGS. 7 and 8, adjustment means 52 includes an adjusting screw 59 which proceeds through a through bore 60 in fixed portion 58. The free end of adjusting screw 59 then passes through two Belleville washers 61, a type of spring washer, and a prevailing torque nut 62. The free end of the adjusting screw 59 then proceeds through threaded aperture 63 of attachment plate 64, which is mounted to main portion 46 of cutting table 45. Threaded aperture 63 registers with blank bore 65 in main portion 46 of cutting table 45. Adjusting screw 59 here is a 3/8-16 Allenhead screw which advances 1/16 inch per revolution. Adjusting screw 59 is countersunk in bore 60. The cap of adjusting screw 59 is accessed by an allenwrench, which provides a rotational reference to the operator. Prevailing torque nut 62 is again an elastic stop nut. The combination of the prevailing torque nut and Belleville washers absorb the vibration forces caused by the saw. FIGS. 5 and 9 show the mounting of dial indicator 40 similar to its mounting in the first embodiment shown in FIGS. 3 and 4.

The operation of the embodiment shown in FIGS. 5–9 is virtually identical to the embodiment shown in FIGS. 1–4.

Figure 12:
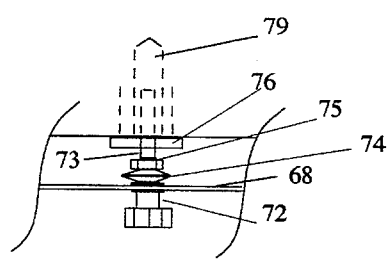
FIG. 12 is a top plan view, partially in cut-away, of a portion of FIG. 10.
Figure 13:
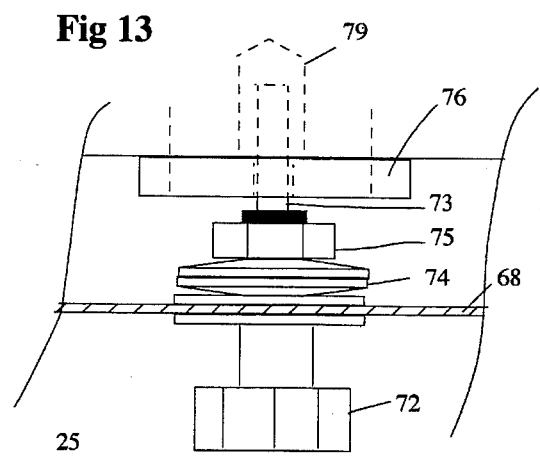
FIG. 13 is an enlargement of a portion of FIG. 12.

FIGS. 10–14 show a third embodiment of the adjustable saw table. This embodiment is a factory constructed embodiment and not a retrofit embodiment. In this embodiment, the adjustable table saw comprises rails 43, a sheet steel base plate 68 having a flange 69, and a cutting table 45. Cutting table 45 is identical to the cutting table shown in FIG. 5. Adjustment means, severally indicated at 70, and dial indicator 71 are mounted to flange 69. Adjustment means, 70 is best shown in FIGS. 12 and 13, and comprise adjusting knobs 72 mounted to the head of adjusting screw 73 which passes through an aperture in flange 69, Belleville washers 74, a prevailing torque design nut 75, which is an elastic stop nut, threaded aperture 76 of threaded attachment plate 78 and blank bore 79.

Figure 14:
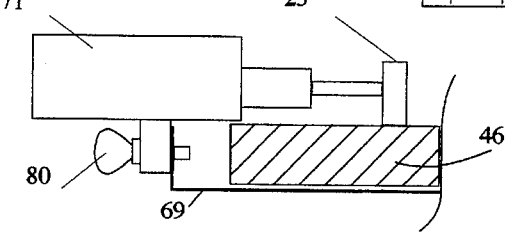
FIG. 14 is a sectional view taken along line 14—14 in FIG. 10.

FIG. 14 shows the mounting of dial indicator 71 by screw 80 to flange 69, and its interaction with dowel 25.

One current deficiency of radial arm saws is the difficulty of making precision kerf adjustments. Occasionally, a groove is required that is slightly wider than the kerf made by the saw blade. The invention can provide a slightly wider kerf from one pass of the work piece by positioning the rip-cut guide fence so that the saw blade presents a slightly wider aspect to the work piece. This aspect is a function of the depth of the groove as well as the angle of the rip-cut guide fence to the saw blade. A deeper grove will present a larger chord, and consequently a wider groove for the same rip-cut guide fence angle. A disadvantage of this method is that the groove will not be rectangular, especially with deeper grooves. However, this method is highly effective for slight adjustments such as making a sliding fit with a matching point.

Modifications

The invention is not limited to the previously enclosed embodiments. Therefore, while preferred forms of the precision adjustable table and methods for using it have been shown and described, and various changes and modifications therein discussed, persons skilled in this art will readily appreciate the various additional changes and modifications may be made without departing from the spirit of the invention, as defined and differentiated by the following claims:

We claim:

1. A precision adjustable table adapted for use with a radial arm saw, said radial arm saw adapted to make rip-cuts and cross-cuts of desired cut widths to a work piece, and including a circular saw blade and a base table, comprising:

a cutting table slidably mounted to said base table;

a flange fixedly mounted to said base table;

adjustment means mounted to said flange for precisely and accurately positioning said cutting table in relation to said base table and said saw blade;

said adjustment means including a blind bore in said cutting table, an attachment plate having a threaded aperture, said attachment plate mounted to said cutting table such that said aperture and said blind bore register, and adjusting screw apparatus;

said adjusting screw apparatus including an adjusting screw having a head portion and a threaded shaft portion, said shaft portion having a first end mounted to said head portion and a free end, said shaft portion free end passing sequentially through a first washer, an aperture in said flange, a second washer, a spring washer, a nut, said attachment plate aperture and said blind bore; and measuring means mounted to said flange to precisely and accurately measure the position of said cutting table in relation to said base table and said saw blade;

whereby the rotation of said adjusting screw repositions said cutting table in relation to said base table and saw blade.

2. The precision adjustable table described in claim 1 further comprising a plurality of adjustment means.

3. The precision adjustable table described in claim 2 wherein each adjustment means is located adjacent an end of said flange.

4. The precision adjustable table described in claim 1 wherein said adjusting screw is a ⅜-16 allenhead cap screw which advances 0.06250 inch per revolution.

5. The precision adjustable table described in claim 4 wherein said attachment plate aperture is tapped to mate with said ⅜-16 allenhead cap screw.

6. The precision adjustable table described in claim 1 wherein said adjusting screw is a ¼-20 NC machine screw which advances 0.05000 inch per revolution.

7. The precision adjustable table described in claim 6 wherein said attachment plate aperture is tapped to mate with said ¼-20 NC machine screw.

8. The precision adjustable table described in claim 1 wherein said adjusting screw is a 10-32 NF machine screw which advances 0.03125 inch per revolution.

9. The precision adjustable table described in claim 8 wherein said attachment plate aperture is tapped to mate with said 10-32 NF machine screw.

10. The precision adjustable table described in claim 1 wherein said nut is a prevailing torque nut.

11. The precision adjustable table described in claim 1 wherein said spring washer is a Belleville washer.

12. The precision adjustable table described in claim 1 wherein said measuring means comprises:

a dial indicator having a dial portion and a measuring shaft, said measuring shaft adapted to actuate along its axis of elongation and having a first end slidably mounted to said dial portion and a second free end;

a post mounted to said cutting table;

said dial indicator mounted to said flange such that said measuring shaft free end presses against said post;

whereby movement of said cutting table causes movement of said post and a corresponding actuation of said measuring shaft.

\* \* \* \* \*